Dec. 28, 1965  S. P. FILIPSKI ETAL  3,226,523
GAS ARC WELDING WITH ARGON-HYDROGEN MIXTURE
Filed Dec. 28, 1962

INVENTORS
STANLEY P. FILIPSKI
HOWARD R. MILLER
ARTHUR J. NEWMAN
BY Richard S. Shreve Jr.
ATTORNEY

United States Patent Office 3,226,523
Patented Dec. 28, 1965

3,226,523
GAS ARC WELDING WITH ARGON-HYDROGEN MIXTURE
Stanley P. Filipski, Caldwell, Howard R. Miller, Clark, and Arthur J. Newman, North Plainfield, N.J., assignors to Union Carbide Corporation, a corporation of New York
Filed Dec. 28, 1962, Ser. No. 248,129
6 Claims. (Cl. 219—74)

This invention relates to gas arc welding with argon-hydrogen mixture and, more particularly, to such welding of metal alloys which are difficult to weld.

Metals such as copper-nickel, nickel-copper, 300 and 400 series stainless steels, precipitation hardening steels, nickel-chromes and chrome-nickels, and some copper base materials, excluding brasses, are difficult to weld because they contain constituents which tend to form refractory oxides which resist heat penetration.

A shielding gas of argon tends to prevent such oxide formation but a shielding gas of helium is more effective in breaking up such as are formed. However, helium is more expensive and in shorter supply. The addition of hydrogen to argon tends to reduce the oxides but, heretofore, when welding tight butt joints of thick gage material (1/8 in. and greater) the percentage of hydrogen was limited by the development of porosity in the weld. When welding 1/8 in. thick material a maximum of 8 percent hydrogen is allowable and for 3/16 in. thick material a maximum of 4 percent hydrogen.

When the welding process requires heat transfer through metal for penetration, the heat spreads laterally and forms a wide bead not satisfactory for thickness over 1/8 in. Hence, edge preparation and multipass operations are required for greater thicknesses.

The main objects of the present invention are therefore to weld tight, square butt joints or very narrow V-joints which heretofore needed edge preparation for spacing in order to use hydrogen, to avoid the expense of helium, to increase the thickness of metal capable of being welded in a single pass, and to avoid undercutting and porosity in the weld in the welding of such difficult metals.

According to our invention, we have employed the process of Gage Patent No. 2,806,124, in which a flow of gas is maintained between an electrode and a workpiece, an arc is drawn in said flow between said electrode and said workpiece, and a portion of the length of the arc is directed and stabilized by passing said arc and flow of gas through a constricted passageway to direct effluent plasma upon said workpiece.

This process, known as plasma arc, was developed and has been used only for cutting operations. The velocity of flow and strength of current, which are desirable for cutting, are too extreme for welding. However, we have found that by controlling the velocity and power level with respect to the workpiece thickness, while maintaining or increasing the speed of progress along the workpiece, a keyhole effect can be produced such that while the plasma melts and cuts the metal, the metal flows around the plasma stream and unites to form a weld.

We have also employed, in the gas flow, a gas consisting of argon containing from 2½ percent to 15 percent of hydrogen. The keyhole effect enables the welding of square butt or narrow V-joints with hydrogen in argon gas mixtures without resulting in porosity in the finished weld, but permitting increased welding speeds. This has not been possible heretofore.

Figure 1:
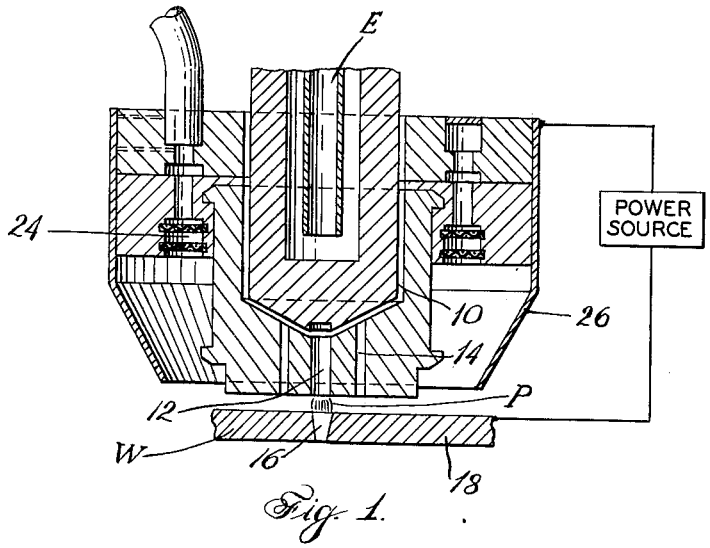
FIGURE 1 is a vertical section through a torch employed for carrying out the process according to the present invention.
Figure 2:
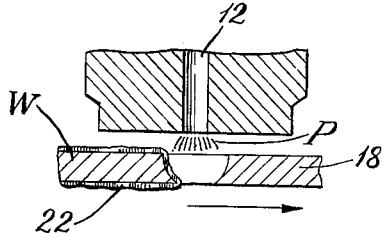
FIGURE 2 is a similar cross-section at right angles to FIGURE 1.
Figure 3:
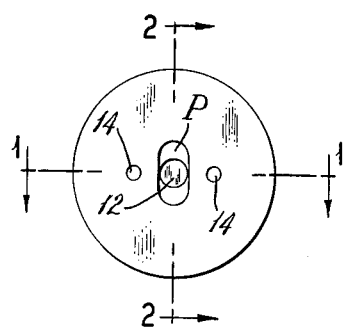
FIGURE 3 is an inverted plan of the workpiece showing the effect of the process.

The argon gas, containing from 2½ percent to 15 percent hydrogen, flows down through the central bore of the torch into an arc chamber 10, from which it flows through a central constricted passage 12. The arc is struck through the gas in the passage 12 between the electrode E, preferably of tungsten, and the workpiece W of metal to be welded. The passageway 12 defines and stabilizes the arc and the resulting velocity of the arc effluent causes a plasma to operate upon the workpiece.

A part of the gas from the arc chamber 10 passes through arc shaping ports 14 which are spaced laterally from the passage 12 so as to elongate in the direction of the weld the otherwise circular cross-section of the effluent plasma P from the passage 12.

The plasma impinging upon the workpiece has a keyhole effect (when operating on thick gage material more than 3/32 in.) whereby a small diameter hole 16 is pierced in the plate and moved at the proper speed so that the base metal 18 is fused ahead of the keyhole and caused to flow around it and solidify and form a weld 20 with a smooth underbead 22.

In additional to transferring more heat to the base metal, the hydrogen burns as it issues from the gas nozzle and shields a larger area than would be caused by argon alone.

The same shielding gas, as that in the chamber 10, is supplied to a chamber containing a gas lens 24 from which it passes inside an annular shroud 26 which discharges an annular shield of such gas outside of the effluent plasma from the passage 12 and the gas stream from the ports 14.

*Example*

General welding conditions for a square butt weld in 3/16 in. thick 70–30 copper-nickel:

Current—130 amperes, D.C.S.P.
Voltage—34
Argon shielding gas—40 cu. ft./hr., 7.5% hydrogen
Argon orifice gas—10 cu. ft./hr., 7.5% hydrogen
Backup gas—40 cu. ft./hr., 7.5% hydrogen
Travel speed—10 i.p.m.
Multiport orifice—center hole 0.093 in. diameter
Port holes—0.04 in. diameter on 0.133 in. radius from center.

The same conditions were employed on square butt joints of ¼ in. copper-nickel pipe; X-rays of these welds have shown them to be free of porosity. Similarly, square butt joints of 3/16 in. 300 series stainless steel have been welded with 15 percent hydrogen in the argon.

What is claimed is:

1. Method of gas arc welding of porosity free tight butt joints in metals containing constituents tending to form refractory oxides and a thickness of one eighth to one quarter of an inch in a single pass, which comprises maintaining a flow of gas consisting of argon containing a proportion inversely to the metal thickness of up to 15 percent hydrogen between an electrode and a workpiece of such metal, drawing an arc in said flow of gas between said electrode and said workpiece, directing and stabilizing a portion of the length of said arc by passing said arc and flow of gas through a constricted passageway to direct effluent plasma upon said workpiece, and pierce a small diameter hole in the workpiece, controlling the velocity and power level with respect to the workpiece and moving said arc at the proper speed to produce a keyhole effect and fuse the base metal ahead of the hole to flow around it and solidify to form a weld with a smooth underbead.

2. Method of gas arc welding as claimed in claim 1, in which the percentage of hydrogen in the argon is for one eighth inch metal a maximum of 8 percent, and for 3/16 inch metal a maximum of 4 percent.

3. Method of gas arc welding as claimed in claim 2, in which the metal being welded is 70–30 copper-nickel.

4. Method of gas arc welding as claimed in claim 1, in which the metal being welded is 300 series stainless steel.

5. Method of gas arc welding of tight butt joints in metals containing constituents tending to form refractory oxides, which comprises maintaining a flow of gas consisting of argon containing up to 15 percent of hydrogen between an electrode and a workpiece of such metal, drawing an arc in said flow of gas between said electrode and said workpiece, directing and stabilizing a portion of the length of said arc by passing said arc and flow of gas through a constricted passageway to direct effluent plasma upon said workpiece and pierce a small diameter hole in the workpiece, and passing a flow of the same gas through arc shaping ports spaced eccentrically to the plasma and laterally with respect to the weld to elongate the cross section of the plasma in the direction of the weld.

6. Method of gas arc welding of tight butt joints in metals containing constituents tending to form refractory oxides, which comprises maintaining a flow of gas consisting of argon containing up to 15 percent hydrogen between an electrode and a workpiece of such metal, drawing an arc in said flow of gas between said electrode and said workpiece, directing and stabilizing a portion of the length of said arc by passing said arc and flow of gas through a constricted passageway to direct effluent plasma upon said workpiece, and pierce a small diameter hole in the workpiece, and moving said arc at the proper speed to fuse the base metal ahead of the hole to flow around it and soldify to form a weld with a smooth underbead, passing a flow of the same gas along the effluent plasma and spaced laterally with respect to the weld to elongate the cross section of the plasma in the direction of the weld, and passing an annular flow of shielding gas in surrounding relation to said effluent plasma and said arc shaping flow of gas.

References Cited by the Examiner
UNITED STATES PATENTS

| | | | |
|---|---|---|---|
| 1,746,191 | 2/1930 | Devers | 219—74 |
| 2,497,631 | 2/1950 | Rothschild | 219—74 |
| 2,806,124 | 9/1957 | Gage | 219—121 |
| 2,905,805 | 9/1959 | McElrath et al. | 219—137 |
| 3,148,263 | 9/1964 | Jensen | 219—75 |

RICHARD M. WOOD, *Primary Examiner.*